United States Patent [19]

Blenkush

[11] 4,436,125

[45] Mar. 13, 1984

[54] QUICK CONNECT COUPLING

[75] Inventor: Brian J. Blenkush, Maple Grove, Minn.

[73] Assignee: Colder Products Company, St. Paul, Minn.

[21] Appl. No.: 359,071

[22] Filed: Mar. 17, 1982

[51] Int. Cl.³ .............................................. B67C 9/00
[52] U.S. Cl. ..................................... 141/330; 137/797; 251/149.6; 604/905
[58] Field of Search ................. 141/329, 330, 1, 346, 141/348, 349, 383, 392; 251/149.1, 149.6; 285/3; 604/323, 326, 411, 414, 415, 905; 137/797, 798; 222/80, 81, 83, 89

[56] References Cited

U.S. PATENT DOCUMENTS

| 1,248,705 | 12/1917 | Pogue | 141/330 X |
| 2,263,293 | 11/1941 | Ewald | 251/149.6 |
| 3,391,951 | 7/1968 | Miller | 285/3 |
| 3,825,222 | 7/1974 | Petrova | 251/149.6 |
| 4,338,933 | 7/1982 | Bayard et al. | 251/149.1 X |

FOREIGN PATENT DOCUMENTS 738173  7/1966  Canada ................................ 141/330

OTHER PUBLICATIONS

Catalog, "Thermo Plastic and Chrome Plated Quick Couplings and Components for Flexible Tubing", No. 781, Colder Products Company.
Brochure, "Thermo Plastic Quick Couplings for Flexible Tubing", No. 382C, Colder Products Company.

Primary Examiner—Stephen Marcus
Assistant Examiner—Mark Thronson
Attorney, Agent, or Firm—Merchant, Gould, Smith, Edell, Welter & Schmidt

[57] ABSTRACT

A quick connect/disconnect coupling assembly (10) defining a fluid flow path is disclosed. The coupling assembly (10) includes a female coupling member (12) adapted for connection to a conduit (14) and a male coupling member (18) adapted for connection to a conduit or container (20). The female coupling member (12) includes a poppet valve assembly (90) which functions as an automatic shut-off when the female coupling member (12) is not interconnected to the male coupling member (18), the male coupling member (18) being adapted for removeable partial insertion into the female coupling member (12). The valve assembly (90) of the female coupling member (12) further includes a needle-like structure (92) for puncturing a penetrable membrane (28) at the front end of the male coupling member (18) upon insertion of the male coupling member (18) into the female coupling member (12) thereby enabling the flow of fluid therethrough.

8 Claims, 13 Drawing Figures

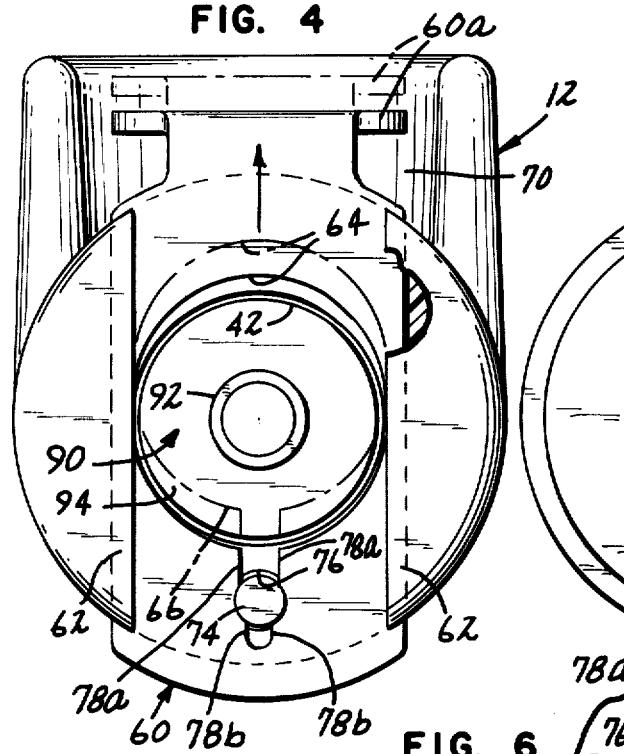
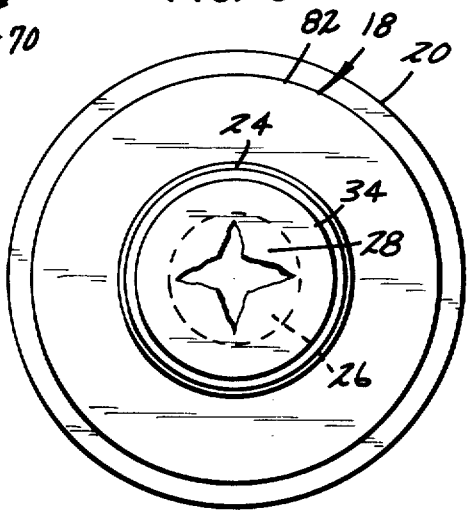
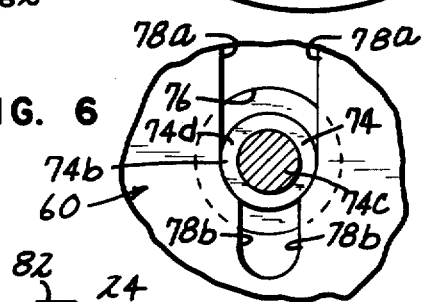
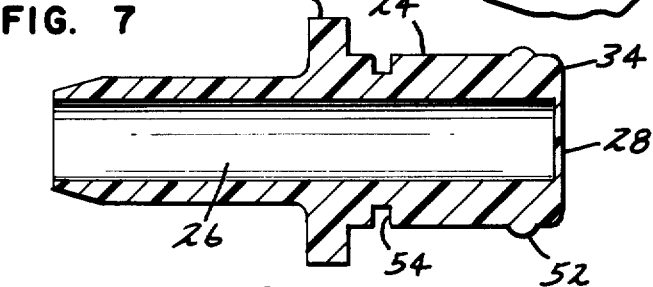
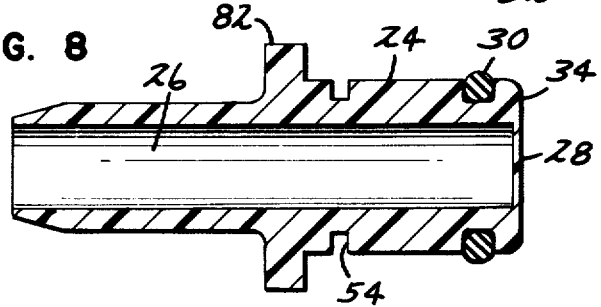

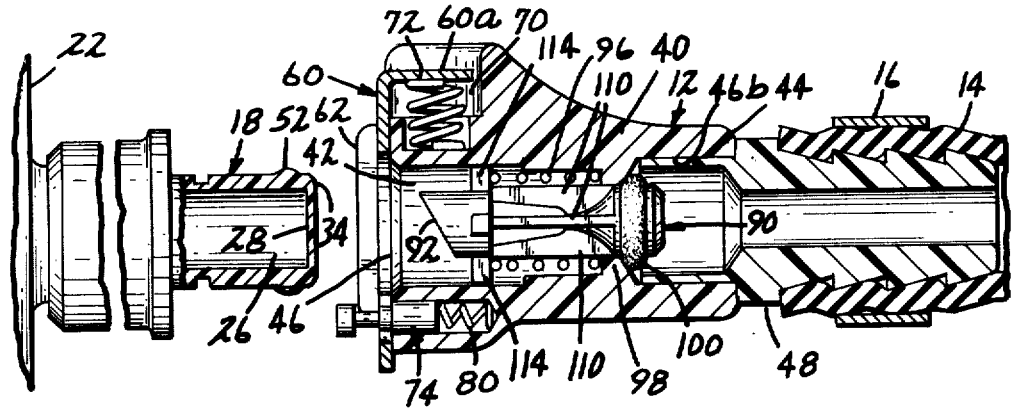
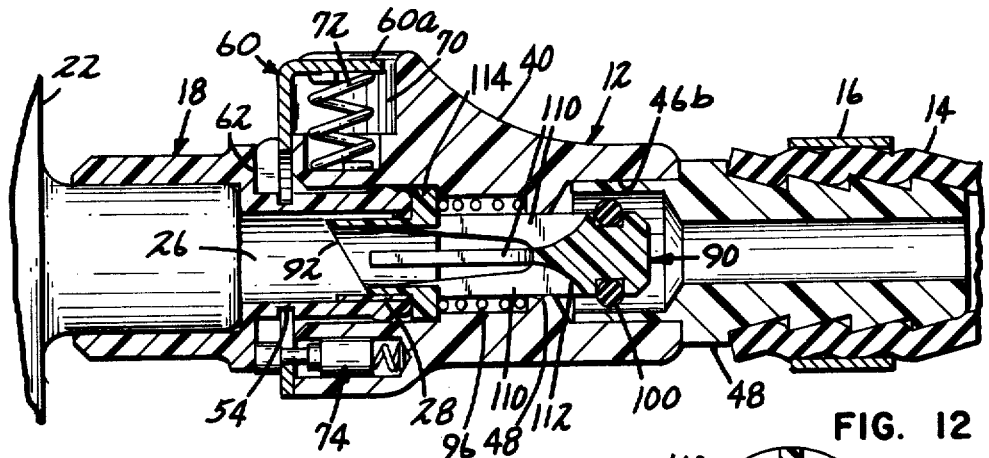
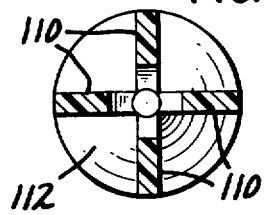
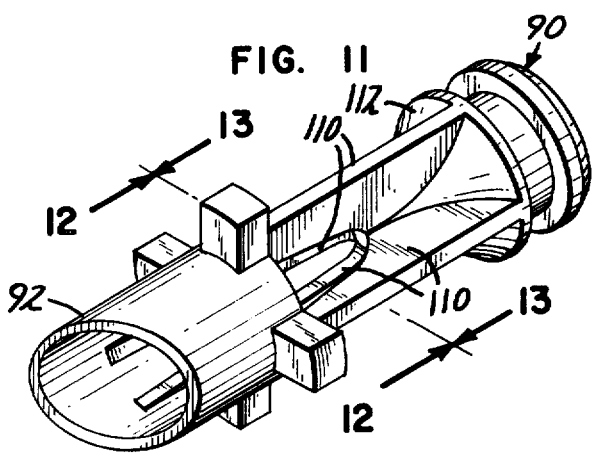
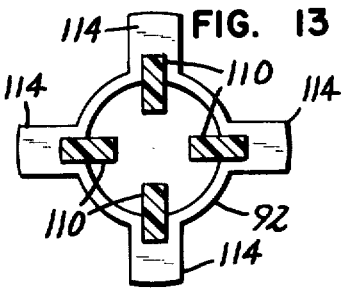

QUICK CONNECT COUPLING

TECHNICAL FIELD OF THE INVENTION

The present invention relates to quick connect/disconnect coupling assemblies. More particularly, the present invention relates to a quick connect/disconnect coupling assembly utilizing a disposable male coupling portion sealed by a membrane which in turn is punctured upon attachment of the male coupling portion to a female coupling portion.

BACKGROUND OF THE INVENTION

Quick connect/disconnect coupling assemblies for small flexible tube application are known in the art. Such couplings are utilized for bio-medical applications, convenience handling, beverage dispensing, instrument connections, photochemical handling, etc.

Frequently, such as in the beverage dispensing industry or medical industry, it is desirable to keep fluid containers sealed until the time of use. With present coupling assemblies, the container is sealed at the time of filling the container. When utilized, the container seal must be broken and the coupling assembly attached thereto. This is very often a time consuming and tedious process. In addition, it is even more undesirable in the medical arts area wherein it is of utmost importance to maintain the sterilized condition of medical supplies.

The present invention solves this problem and many others by providing a coupling assembly which includes a disposable male member which is sealed by suitable membrane seal and a female coupling member which includes a needle-like structure for penetrating the membrane seal upon releasable attachment of the male coupling member to the female coupling member.

SUMMARY OF THE INVENTION

The present invention relates to a quick connect/disconnect coupling assembly including female and male coupling means, each defining a fluid passageway therethrough. The male coupling means is constructed and arranged for releasably attaching to the female coupling means. The male coupling means includes means sealing the passageway therethrough and the female coupling means includes means for puncturing the sealed means upon releasable attachment of the female and male coupling means.

In one embodiment of the present invention, a low density polyethylene membrane encloses one end of the male coupling member which has a generally hollow tubular configuration. The female coupling member includes a poppet or valve assembly which is slidably mounted in a borelike cavity of the female coupling member for reciprocating longitudinal axial movement thereof between a front end position and a back end position. The poppet assembly is biased toward the front end of the female coupling member, such that when the male coupling member is removed therefrom, the poppet assembly is moved into the front end position and sealingly engages an inwardly projecting member of the female coupling member so as to prevent fluid transfer therethrough.

The poppet assembly further includes a needle-like structure at the front end thereof for puncturing the membrane seal of the male coupling member. An outwardly extending collar near the needle structure engages the end of the male coupling member whereby upon insertion of the male coupling member the poppet assembly axially slides to the back end position. The male coupling member includes a collar portion which engages the front end of the female coupling member thereby limiting the axial extent to which the male coupling member is inserted into the female coupling member. Upon insertion of the male coupling member, the needlelike structure which is of a lesser outside diameter than the inside diameter of the male coupling member will puncture the membrane seal and axially slide into the male coupling member. Due to the low density polyethylene utilized the force required to puncture the membrane of the male coupling member is very minimal and barely noticeable, thereby providing for easy attachment of the coupling assembly.

The poppet utilized in one embodiment has a generally tubular shape with an aperture near the back end thereof such that when the poppet assembly is moved to the back end position, the aperture provides for fluid flow through the coupling assembly.

In yet another embodiment, the poppet assembly has a rib-like structure interconnecting the needlelike structure and the back end such that a plurality of fluid flow paths are defined.

The coupling assembly in yet another embodiment further includes a locking collar mounted on the housing of the female coupling member for releasably locking the male coupling member and the female coupling member in an attached position. The locking collar is activated by a locking pin which engages the outwardly extending collar on the male coupling member and further includes a lever for easy and quick release of the locking collar with one simple motion.

Yet another feature of the present invention is that the back end portion of the male coupling member can be constructed and arranged for varying applications. For example, the back end portion can be adapted for being friction sealed to the inside of a container spout or the like. In alternate embodiments, the back end portion is constructed and arranged for being suitably attached to the outside of a container spout or the like as an external mount. Thus the present invention is adaptable to many different applications.

In addition, the male coupling member is very inexpensive to manufacture, thereby allowing for its disposal after a single use. This allows for utility with pre-packaged fluids or substances.

The above described features and advantages along with various other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof and to the accompanying descriptive matter in which there is illustrated and described a preferred embodiment of the invention.

BRIEF DESCRIPTION OF THE DRAWINGS

In the drawings, in which like reference numerals and letters indicate corresponding parts throughout the several views.

FIG. 4 is an elevational view along line 4—4 of FIG. 1;

FIG. 5 is an elevational view along line 5—5 of FIG. 1;

FIG. 6 is a sectional view of a portion of FIG. 4;

FIG. 7 is an axial view of one embodiment of a male coupling member of the present invention;

FIG. 8 is an axial view similar to FIG. 7 of an alternate embodiment of a male coupling member of the present invention;

FIG. 9 is an axial view similar to FIG. 2 of an alternate embodiment of the present invention;

FIG. 10 is an axial view similar to FIG. 3 of an alternate embodiment of the present invention;

FIG. 11 is a view in perspective of an alternate embodiment of a poppet assembly utilized in the present invention;

FIG. 12 is an end elevational view along line 12—12 of FIG. 11; and

FIG. 13 is an elevational view along line 13—13 of FIG. 11.

DETAILED DESCRIPTION OF THE INVENTION

Figure 1:
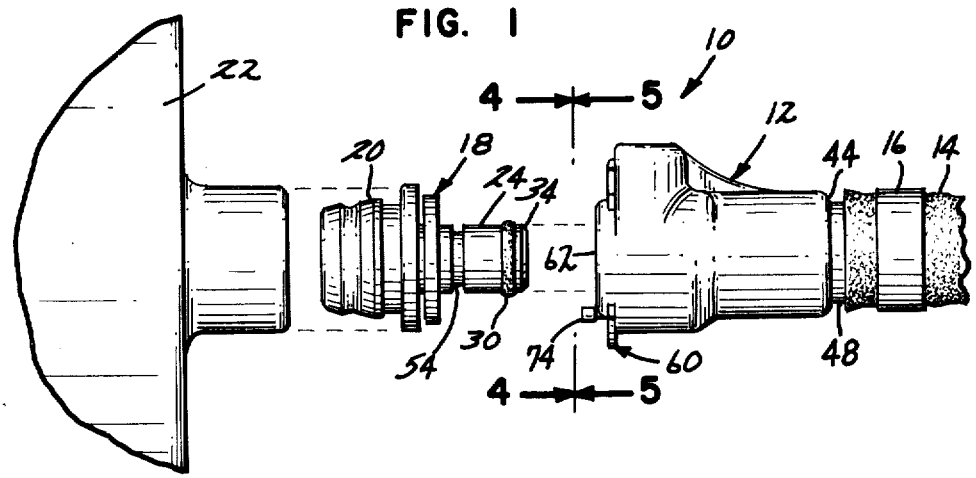
FIG. 1 is a view in perspective of the present invention.

Referring now to the drawings, there is shown in FIG. 1 a preferred embodiment of a coupling assembly 10 embodying the principles of the present invention. Coupling assembly 10 includes the female coupling member 12 adapted for connection to a conduit 14 or the like in any suitable manner. Coupling assembly 10 further includes a male coupling member 18 which is also adapted for connection to a conduit 20 or the like in any suitable manner such as by friction sealing, cement sealing, etc. Conduit 20 to which male coupling member 18 is connected might, for example, be a plug utilized to seal a spout of a container 22 which holds a fluid for dispensing therefrom. Coupling members 12 and 18 are each, in turn, adapted to releasably connect to each other so as to provide a fluid-tight passageway or connection between conduits 14 and 20.

Figure 2:
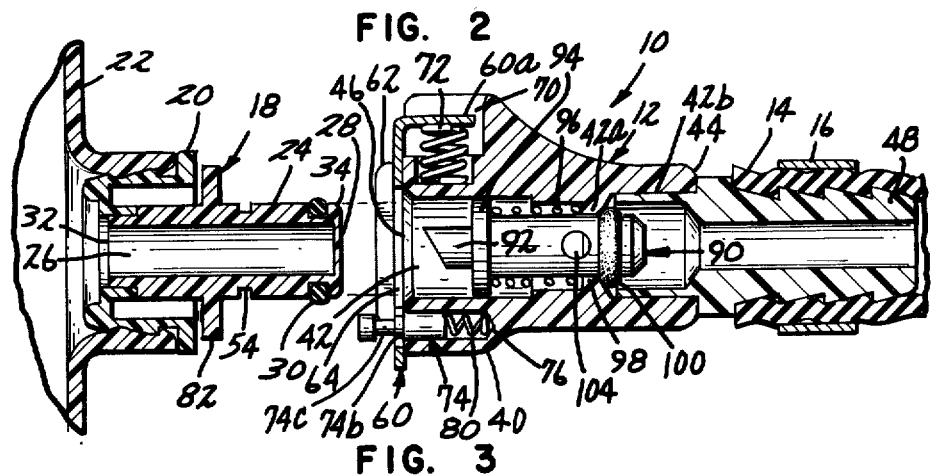
FIG. 2 is an axial view of the embodiment shown in FIG. 1.

More particularly, as illustrated in FIG. 2, male coupling member 18 has a generally hollow tubular housing 24 which defines a longitudinal axial tubular bore 26 or passageway on the inside thereof. Housing 24 has a back end 32 which is open and in connection with conduit 20 and a front end 34 which engages female coupling member 12 and is enclosed by a transversely extending membrane seal 28. Preferably membrane seal 28 is integral with housing 24 such that coupling member 18 is molded by a unitary process as a single piece thereby reducing the manufacturing cost and allowing coupling member 18 to be utilized as a disposable item. In one preferred embodiment, coupling member 18 is made from a low density polyethylene with membrane 28 having a thickness of from 0.010 to 0.012 inches.

Coupling member 12 has a housing 40 which also defines an inner tubular bore 42 along a longitudinal axis thereof. Both ends of bore 42 are open with back end 44 being suitably attached to conduit 14. In the embodiment shown, back end 44 is sonic welded to a barbed tubular plastic hose 48 which in turn is connected to conduit 14 with a band 16 being utilized to assure a fluid-tight seal. Tubular bore 42 at front end 46, has an inside diameter which is slightly greater than the outside diameter of housing 24 such that housing 24 is releasably insertable into the bore of coupling member 12.

As illustrated in FIG. 8, one embodiment of housing 24 near front end 34 has on its outer surface an indentation about the circumferential extent thereof which is adapted for reception of an O-ring 30. O-ring 30 extends slightly above the outer surface of housing 24 so as to provide a fluid-tight seal between the housing outer surface and the inner surface of bore 42.

In yet another embodiment shown in FIG. 7, housing 24 is illustrated as having an integral collar-like member 52 about the circumferential extent thereof near front end 34. Collar member 52 protrudes slightly above the outer surface of housing 24 so as to provide a fluid-tight seal with the inner surface of bore 42.

As illustrated in FIG. 2, further removed from front end 34 of coupling member 18 is a second indentation 54 in the outer surface of housing 24 which extends about the circumferential extent thereof. Indentation 54 cooperates with a releasible locking mechanism mounted near the front end of housing 40 of female coupling member 12 so as to releasably lock both coupling members together when coupling member 18 is inserted a predetermined axial distance into coupling member 12.

Figure 3:
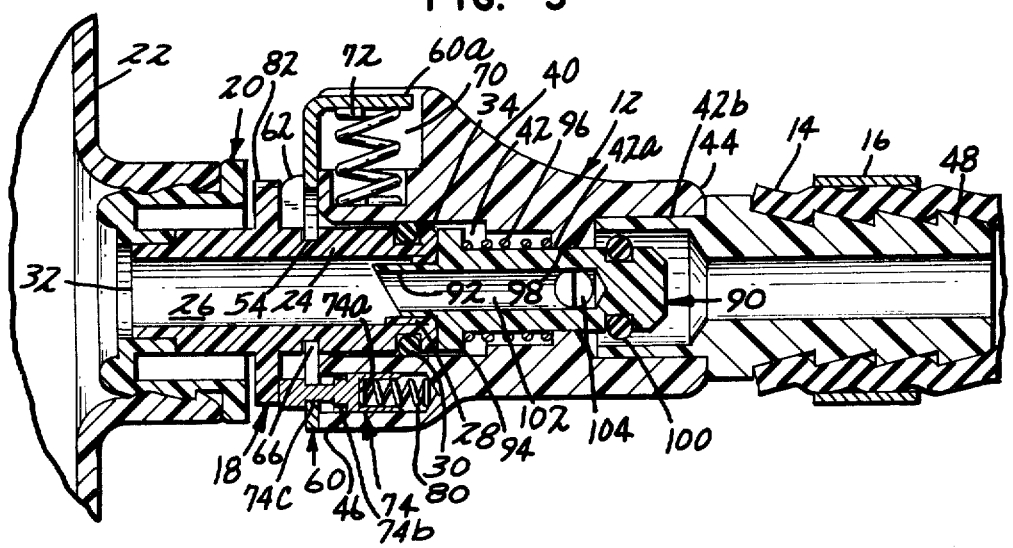
FIG. 3 is an axial view similar to FIG. 2 wherein the parts are in a differing relationship.

The locking mechanism includes a locking collar or plate 60 which is slideably mounted in grooves formed by two integral members 62 extending from the front end of housing 40. Plate 60 is slideably mounted for transverse movement of bore 42 between a first or released position as illustrated in FIGS. 2 and 4 and a second or locking position as illustrated in FIGS. 3 and 4.

Plate 60 defines an annular aperture 64 therein such that in the open position as illustrated by the solid line in FIG. 4, housing 24 of the male coupling member can be inserted therethrough into bore 42 of the female coupling member 12. In the locked position as illustrated by the dotted line in FIG. 4, an inner edge 66 of plate 60 projects into the bore of coupling member 12 and engages indentation 54 on the male coupling member 18, as illustrated in FIG. 3, thereby releasably locking coupling member 18 with coupling member 12.

Housing 40 of coupling member 12 is constructed and arranged so as to form an indentation or cavity 70 on one side thereof near front end 46. Plate 60 includes a portion 60a which is folded over so as to provide a relatively flat lever which fits in the space provided by indentation 70. A coiled spring 62 is positioned between lever portion 60a and the bottom of indentation 70 so as to bias plate 60 transversely of bore 42 and toward the second or locked position wherein plate 60 engages indentation 54 of the male coupling member. A locking pin 74 of varying diameter, positioned in an axially extending bore 76, serves to retain plate 60 in its open or unlocked position when the coupling members are not attached. Bore 76 is positioned radially outward from bore 42 and on the opposite side of bore 42 from lever 60a so as to be diametrically opposed to lever 60a.

Pin 74 extends through a slot defined by edges 78a, 78b in plate 60 which extend radially outward from inner edge 66. Pin 74 is axially moveable between a first position wherein pin 74 retains plate 60 in its unlocked state and a second position wherein pin 74 allows spring 72 to move plate 60 into its locking position. Pin 74 in its second position also serves to limit the distance which plate 60 moves from its unlocked position to is locked position.

A coiled spring 80 is positioned between a collar portion 74a of pin 74 and the end of bore 76 so as to axially bias pin 74 toward the first position. Housing 24 of male coupling member 18 has on its outer surface an outwardly extending collar 82 about the circumferential extent thereof which is spaced a predetermined axial distance from indentation 54 toward the back end housing 24. Collar 82 is constructed and arranged to engage pin 74 as coupling member 18 is inserted into coupling member 12 such that pin 74 is axially slid into its second position.

As illustrated in FIGS. 4 and 6, radially extending edges 78a are spaced farther apart than edges 78b such that the slot in plate 60 has a portion near edge 66 with a greater width than the portion near the end of the slot farthest removed from edge 66. When pin 74 is in the first position, or unlocked position, a portion 74b of pin 74 having a greater diameter than the width of the slot defined by edges 78b extends through the slot so as to make contact with edges 78b and prevent plate 60 from being moved into the locked position by coil spring 72.

As male coupling member 18 is inserted into female coupling member 12, collar 82 engages the end of lock pin 74 and moves it axially until a portion 74c of locking pin 74 having a diameter less than the width of the slot defined by edges 78b is aligned therewith such that locking pin 74 no longer engages edges 78b. Plate 60 is then moved into the locking position by coil spring 72 and engages indentation 54.

By pressing radially inward on plate 60a, plate 60 is caused to move radially such that pin 74 extends through the enlarged slot portion near edge 66. In addition, plate 60 is disengaged from indentation 54, whereby male coupling member 18 can be removed from female coupling member 12. When coupling member 18 is removed, spring 80 biases pin 74 toward its first position, whereby pin portion 74b engages edges 78b of the slot and retains plate 60 in its unlocked position. Pin 74 includes a portion 74d between portions 74a and 74b which is of greater diameter than 74b so as to engage plate 60 and retain pin 74 in axially extending bore 76.

A valve assembly 90 or automatic shutoff is slideably mounted on a circumferential inwardly projecting member or surface 98 of bore 42 for axial longitudinal movement of bore 42 between first and second positions. Member 98 forms a bore portion 42a of lesser diameter than a bore portion 42b near back end 44 of female coupling member 12. Valve assembly 90 includes a hollow needle-like structure 92 which extends axially toward the front end of coupling member 12. The needle-like structure 92 is constructed and arranged at its front end for puncturing membrane 28 as male coupling member 18 is inserted into female coupling member 12. In the preferred embodiment shown, the front end of needle 92 is biased so as to lie in an oblique plane with respect to the plane of membrane 28. Needle-like structure 92 has an outside diameter which is less than the inside diameter of bore 26 such that as illustrated in FIG. 3 needle-like structure 92 extends a limited axial distance into bore 26 when the coupling members are in a locked or connected position.

Immediately adjacent needle-like structure 92 is an outwardly extending collar 94 which is adapted for guiding valve 90 in bore 42 and for engaging front end 34 of the male coupling member so as to limit the axial distance which needle-like structure 92 extends into the interior of bore 26. In addition, collar 94 retains a coiled spring 96 between itself and inwardly projecting member 98 of housing 40. Coiled spring 96 surrounds the body of the valve assembly and biases the valve assembly toward front end 46 of the female coupling member.

Near the opposite end of valve assembly 90 is an indentation in the outer surface thereof which extends about the circumference thereof and is adapted for retaining an O-ring 100 which serves as a seal between valve assembly 90 and member 98 when valve assembly 90 is in the closed or first position. In addition, O-ring 100 cooperates with member 98 to limit the axial displacement of the valve assembly by spring 96.

When male coupling member 18 is inserted into female coupling member 12, valve assembly 90 is forced axially toward back end 44 of female coupling member 12 into the open or second position. This is accomplished by the engagement of collar 94 with the front end of the male coupling member 18. The axial displacement toward back end 44 is limited by collar 82 on the male coupling member which engages the front end 46 of the female coupling member and prohibits any further insertion.

In the embodiment illustrated in FIGS. 2 and 3, the portion of valve assembly 90 between collar 94 and O-ring 100 is a hollow tubular member 102 closed at the back end and open at the front end so as to allow the flow of fluid from needle-like structure 92 into tubular member 102. An aperture 104 is positioned near O-ring 100 along member 102 such that when valve assembly 90 is in the second position, aperture 104 defines a fluid passageway from the interior of tubular member 102 to bore portion 46a adjacent back end 44 of the female coupling member whereby continuous fluid flow passage is provided through the quick connect coupling.

In yet another embodiment illustrated in FIGS. 9 through 13, that portion of the valve assembly between needle-like structure 92 and O-ring 100 is shown as including four radially extending ribbed members 110 which define multiple flow paths from needle-like structure 92 to enlarged bore portion 46b when the couplings are attached. The rib members 110 are in turn attached at their back ends to a cone-shaped end piece 112 which aids in chaneling the fluid flow around the valve end adjacent the O-ring seal. In addition, rather than a collar 94, this embodiment utilizes four radially projecting members 114 for guiding the valve assembly in bore 42 of the female coupling member.

In yet another embodiment of the present invention as illustrated in FIGS. 9 and 10, projecting members 114 are utilized as a positive locking collar for limiting the axial displacement of valve assembly 90 by male coupling member 18. In this embodiment, projecting members 114 engage an inwardly extending member 116 of housing 40.

Because membrane seal 28 is made of a low density polyethelene it will puncture quite readily as illustrated in FIG. 5 rather than shearing so as to prevent any contamination of the fluid by membrane parts. In addition, since the entire male coupling member 18 can be made from a unitary molding process as a single piece, the cost of manufacturing is greatly reduced allowing the male coupling member to be utilized as a throwaway item after one-time usage.

In a typical application, male coupling member 18 is attached to a container or the like in a suitable manner at the time of filing the container with a fluid or substance so as to effectively seal the contents until use. Female coupling member 12 is in turn typically attached to a dispensing line through which a fluid is to be dispensed. When access to the package or container is required, male coupling member 18 can be grasped by one hand and inserted in female coupling member 12.

As male coupling member 18 is inserted into female coupling member 12, the needle-like structure 92 of the valve assembly 90 punctures membrane seal 28 whereby providing a fluid path through the coupling assembly into the dispensing line. This process is accomplished with very little resistance due to the low density polyethelene material utilized and the relative thinness of membrane seal 28. Once inserted a predetermined distance, the releasable locking mechanism will automatically lock the coupling members together.

When the container is empty, the coupling members can be disconnected with one hand by pressing on lever 60a of the locking mechanism which releases male coupling member 18 and allows it to be withdrawn from female coupling member 12.

When male coupling member 18 is withdrawn from female coupling member 12, the valve assembly 80 is biased into its forward position and automatically seals the fluid passageway through the female coupling member such that there is no spillage or loss of fluid. The empty container and male coupling member 18 can then be disposed of.

The present invention, because of its inexpensive costs and ease of use is particularly advantageous in single use applications such as pre-packaged items. In addition, it is particularly advantageous in those applications such as hospital and laboratory environments where contamination of the fluids must be avoided at all costs. The present invention allows the fluid to be sealed until the very time of use.

It should be understood, however, that even though these numerous characteristics and advantages of the invention have been set forth in the foregoing description, together with details of the structure and function of the invention, the disclosure is illustrative only, and changes may be made in detail, especially in matters of shape, size and arrangement of parts within the principal of the invention to the full extent indicated by the broad general meaning of the terms in which the appended claims are expressed.

What is claimed is:

1. A quick connect/disconnect coupling assembly, comprising:

(a) a female coupling member having a front end and a back end, said female coupling member defining a path for the flow of fluid therethrough;

(b) a male coupling member having a front end and a back end and defining a path for the flow of fluid therethrough, said male coupling member including a hollow tubular portion defining an axial bore adjacent said front end, said tubular portion being enclosed at the front end thereof by a penetrable membrane to seal off said fluid flow path, said tubular portion being constructed and arranged for removeable insertion a predetermined distance into the front end of said female coupling member, said female coupling member defining an axial tubular bore within which said tubular portion of said male coupling member is concentrically received, said tubular portion of said male coupling member including a ring-like seal about its circumference near the front end of said male coupling member for providing a fluid tight seal between the outside surface of said tubular portion and the inside surface of said tubular bore of said female coupling member upon insertion of said male coupling into said female coupling member;

(c) a valve assembly adapted for reciprocating longitudinal axial movement within the tubular bore of said female coupling member between a front end position and a back end position, said valve assembly being constructed and arranged for engaging said male coupling member upon insertion of said male coupling member into said female coupling member whereby said valve assembly is caused to move toward the back end of said female coupling member into said back end position, said valve assembly at a front end including a hollow needle-like member adapted to puncture the penetrable membrane of said male coupling member, whereby fluid flow from said male coupling member to said female coupling member is enabled upon removeable attachment of said male coupling member to said female coupling member, said valve assembly including means for sealing off the fluid flow path through said female coupling member when said valve assembly is in said front end position, whereby said fluid flow through said female coupling member is prevented when said male coupling member is removed therefrom;

(d) locking means proximate the front end of said female coupling member for releasably locking said male coupling member in said female coupling member, said locking means being activated upon insertion of said male coupling member a predetermined distance into said female coupling member;

(e) release means interconnected to said locking means for deactivating said locking means whereby said male coupling member is released by said locking means; and, (f) spring biasing means adapted for biasing said valve assembly toward the front end of said female coupling member into said front end position, whereby when said male coupling member is released from said female coupling member, said valve assembly is biased into said front end position thereby preventing the flow of fluid through said female coupling member.

2. A coupling assembly in accordance with claim 1, wherein the enclosed front end of said male coupling member includes a low density polyethylene membrane.

3. A coupling assembly in accordance with claim 1, wherein said membrane is from 0.010 inches to 0.012 inches in thickness.

4. A coupling assembly in accordance with claim 1, wherein the front end of said elongated member lies in an oblique plane with respect to the front end of said male coupling member.

5. A quick connect/disconnect coupling assembly in accordance with claim 1, wherein said release means includes a lever interconnected to said locking means, said lever deactivating said locking means upon application of a force radially directed toward the longitudinal axis of the coupling assembly.

6. A quick connect/disconnect coupling assembly in accordance with claim 1, wherein said male coupling member is formed as an intregal one piece unit defining a tubular bore and including a ring-like seal about the circumference near the front end, said male coupling member including further a groove at least partially about the circumference thereof, said groove cooperating with said locking means to releasably retain said male coupling member in said female coupling member.

7. A quick connect/disconnect coupling assembly in accordance with claim 1, wherein said means for sealing off the fluid flow path through said female coupling member when said valve assembly is in said front end position includes an O-ring seal abutting against a projection into the bore of the female coupling member.

8. A quick connect/disconnect coupling assembly in accordance with claim 1, wherein said needle-like structure has an outside diameter which is approximately twice the thickness of the penetrable membrane but less than the inside diameter of the tubular bore of the tubular portion of the male coupling member.

* * * * *

UNITED STATES PATENT AND TRADEMARK OFFICE
CERTIFICATE OF CORRECTION

PATENT NO. : 4,436,125

DATED : March 13, 1984

INVENTOR(S) : Brian J. Blenkush

It is certified that error appears in the above-identified patent and that said Letters Patent is hereby corrected as shown below:

Column 3, line 51, after "unitary" insert --molding--.

Column 4, line 9, "intregal" should be --integral--.

Column 4, line 18, "releasible" should be --releasable--.

Column 4, line 64, "is" should be --its--.

Column 6, line 28, "46a" should be --46b--.

Column 6, line 39, "chaneling" should be --channeling--.

Column 6, line 52, "polyethelene" should be --polyethylene--.

Column 6, line 62, "filing" should be --filling--.

Column 7, line 7, "polyethelene" should be --polyethylene--.

Column 8, line 62, "intregal" should be --integral--.

Signed and Sealed this

Second Day of July 1985

[SEAL]

Attest:

DONALD J. QUIGG

*Attesting Officer*     *Acting Commissioner of Patents and Trademarks*